(12) United States Patent
Bockus et al.

(10) Patent No.: US 8,587,693 B2
(45) Date of Patent: Nov. 19, 2013

(54) DETERMINATION OF STORAGE AVAILABILITY FOR FILES TO BE STORED AT ONE OR MORE DEVICE QUALITY PARAMETER SETTINGS

(75) Inventors: Michael Andrew Bockus, Manor, TX (US); Derek Ryan Brewer, Rochester, MN (US); Robert Dale Wilhelm, Cheyenne, WY (US); Jeffrey Owen Manthei, Redwood Falls, MN (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 12/948,365

(22) Filed: Nov. 17, 2010

(65) Prior Publication Data

US 2012/0120268 A1 May 17, 2012

(51) Int. Cl.
*H04N 5/76* (2006.01)
(52) U.S. Cl.
USPC .................................................. 348/231.1
(58) Field of Classification Search
USPC .................. 348/231.99, 231.1, 231.2
See application file for complete search history.

(56) References Cited

U.S. PATENT DOCUMENTS

| | | | | |
|---|---|---|---|---|
| 5,852,467 A * | 12/1998 | Ogino | ......................... | 348/231.1 |
| 6,661,454 B1 * | 12/2003 | Hwang et al. | ............... | 348/231.1 |
| 6,862,106 B1 * | 3/2005 | Matsushima | ................. | 358/1.17 |
| 6,885,395 B1 * | 4/2005 | Rabbani et al. | ............ | 348/231.1 |
| 6,943,833 B1 * | 9/2005 | Kuniba et al. | .............. | 348/231.1 |
| 6,958,774 B2 * | 10/2005 | Kuroiwa | ..................... | 348/231.1 |
| 6,961,087 B1 * | 11/2005 | Yoshida | ...................... | 348/231.1 |
| 7,218,345 B2 * | 5/2007 | Hatano | ....................... | 348/231.1 |
| 7,362,360 B2 | 4/2008 | Kim | | |
| 7,551,787 B2 | 6/2009 | Marks | | |
| 7,626,733 B2 | 12/2009 | Kodama | | |
| 7,688,360 B2 * | 3/2010 | Maeda | ........................ | 348/231.1 |
| 7,729,551 B2 | 6/2010 | Jones | | |
| 7,787,024 B2 * | 8/2010 | Yoshida | ...................... | 348/231.1 |
| 7,800,679 B2 * | 9/2010 | Wakabayashi | ............ | 348/333.02 |
| 7,924,323 B2 * | 4/2011 | Walker et al. | .............. | 348/231.2 |
| 2002/0097326 A1 * | 7/2002 | Kuroiwa | ........................ | 348/231 |
| 2004/0075750 A1 * | 4/2004 | Bateman | ..................... | 348/231.1 |
| 2004/0090539 A1 * | 5/2004 | Kim et al. | ................... | 348/231.1 |
| 2005/0117030 A1 * | 6/2005 | Kim | ............................ | 348/231.1 |
| 2005/0200727 A1 * | 9/2005 | Yoshida | .................... | 348/231.99 |
| 2005/0289616 A1 * | 12/2005 | Horiuchi et al. | ................. | 725/89 |
| 2006/0152601 A1 * | 7/2006 | Parekh | ...................... | 348/231.99 |
| 2006/0171697 A1 * | 8/2006 | Nojima | ......................... | 396/103 |
| 2007/0196101 A1 * | 8/2007 | Maeda | .......................... | 396/439 |
| 2008/0192129 A1 * | 8/2008 | Walker et al. | ............... | 348/231.2 |
| 2009/0231466 A1 * | 9/2009 | Morgan et al. | .............. | 348/231.1 |
| 2009/0290030 A1 * | 11/2009 | Gocho | ......................... | 348/211.2 |
| 2010/0128146 A1 * | 5/2010 | Nojima | ..................... | 348/231.99 |
| 2010/0134654 A1 * | 6/2010 | Tsuda | ......................... | 348/231.1 |
| 2010/0157095 A1 * | 6/2010 | Karn et al. | ................. | 348/231.1 |
| 2011/0128414 A1 * | 6/2011 | Walker et al. | ............ | 348/231.99 |

\* cited by examiner

*Primary Examiner* — Nicholas Giles
(74) *Attorney, Agent, or Firm* — David A. Mims, Jr.; Robert V. Wilder

(57) ABSTRACT

A method, programmed medium and system are disclosed which provide for enabling a user to set the number of images/video that needs to be recorded prior to storing them in memory. The system is configured to manage the resolution and quality of the images/video, either automatically or manually, so that the images or video recordings are stored with the highest possible quality aspects within the free memory space available.

20 Claims, 3 Drawing Sheets

DETERMINATION OF STORAGE AVAILABILITY FOR FILES TO BE STORED AT ONE OR MORE DEVICE QUALITY PARAMETER SETTINGS

FIELD OF THE INVENTION

The present invention relates generally to information processing systems and more particularly to a methodology and implementation for enabling file content quality control for saving files to limited memory space.

BACKGROUND OF THE INVENTION

Currently, when taking digital video or still pictures, the device, for example a camera, cell phone or other wireless device, saves the content in a pre-set mode and continues until the media is full. However, if it is already known that a certain amount of video needs to be taken or a certain number of still pictures is needed, there isn't a good way of knowing and/or ensuring that there will be enough memory to store the video or still pictures.

Some systems provide the ability to change the resolution/quality of an image after the picture has been stored in memory but that process does not enable a user to know ahead of time that there will be enough memory for the video or the taking of a known number of still pictures.

Thus, there is a need to provide an improved video storing system which is designed to avoid the problems set forth above.

SUMMARY OF THE INVENTION

A method, programmed medium and system are disclosed which provide for enabling a user to set the number of images/video that needs to be recorded prior to storing them in memory. The system is configured to manage the resolution and quality of the images/video, either automatically or manually, so that the images or video recordings are stored with the highest possible quality aspects within the free memory space available.

In one example, when a certain number of still pictures or a certain recording time of digital video is needed, this information is entered into a video device by a user and the amount of available free memory space is determined. Different parameters including, inter alia, aspect ratios and picture quality/resolution are evaluated to determine how much storage is required for each combination of parameters for the user-input number of pictures and/or user-input amount of time for video recordings. Various aspect ratios and compression or quality and/or other parameters are assembled in order to determine the maximum picture quality that can be achieved while still fitting all of the requested pictures and/or recorded video into the available free memory. After the device determines various combinations of parameters that are needed to fit the number of pictures, or time of video recording, into the amount of available free memory, the assembled combinations of picture quality parameters are presented to the user and the user is enabled to select a preferred combination of picture quality parameters for the number of pictures or amount of time of video recording needed by the user.

In another embodiment, the particular combination of parameters is implemented automatically according to a predetermined parameter priority listing, e.g. the user may input a predetermined specific aspect ratio as "preferred" and the system would automatically implement the highest resolution combination using only the user-preferred aspect ratio for the number of images and/or amount of video recording designated by the user.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
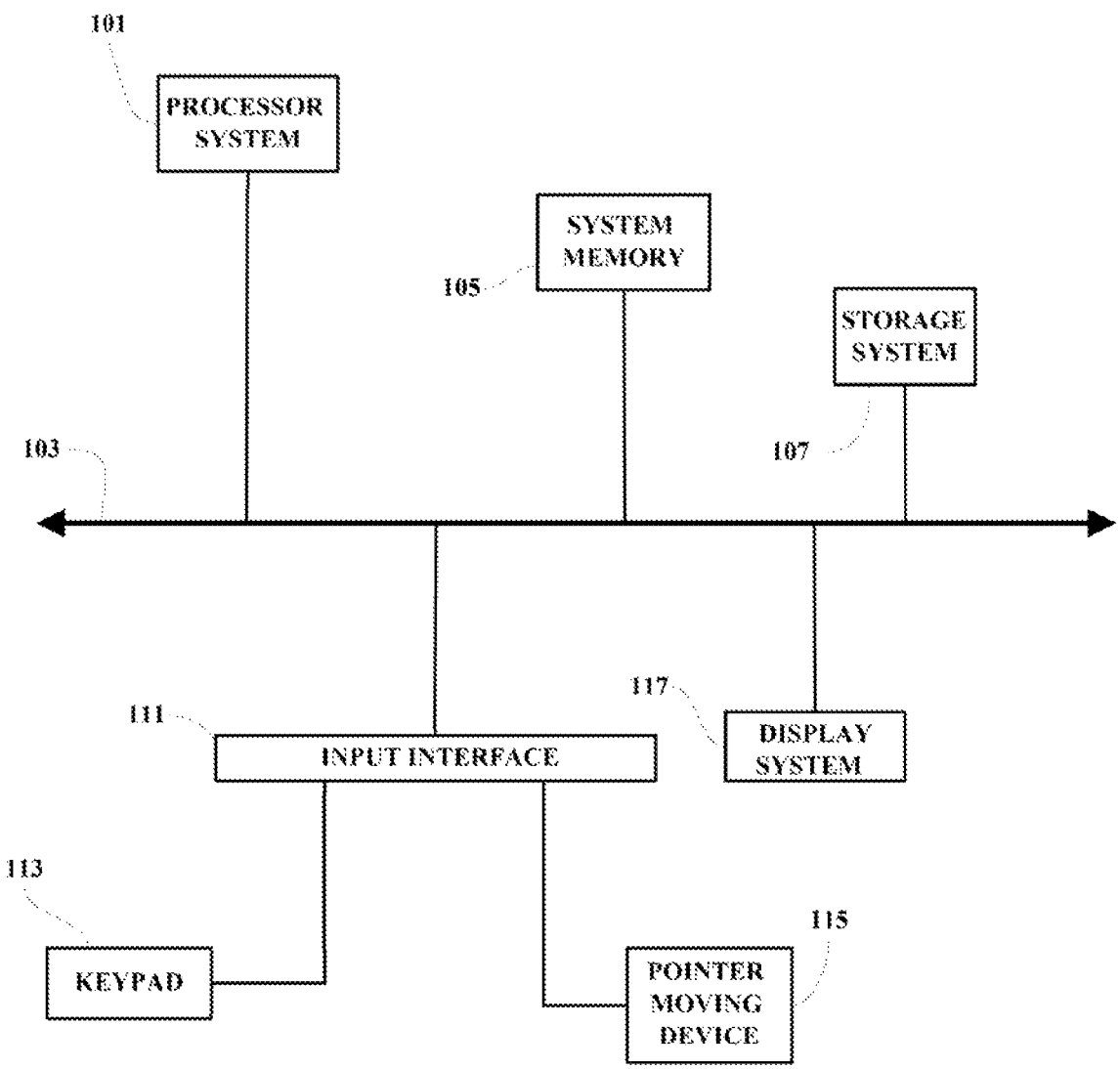
FIG. 1 is an illustration of one embodiment of a system in which the present invention may be implemented.

The various methods discussed herein may be implemented within a computer system which includes processing means, memory, storage means, input means and display means. Such systems are contained within other devices such as cell or other wireless phones, digital cameras and other digital devices. Since the individual components of a computer system which may be used to implement the functions used in practicing the present invention are generally known in the art and composed of electronic components and circuits which are also generally known, to those skilled in the art, circuit details beyond those shown are not specified to any greater extent than that considered necessary as illustrated, for the understanding and appreciation of the underlying concepts of the present invention and in order not to obfuscate or distract from the teachings of the present invention. Although the invention is illustrated in the context of a digital camera or other portable or wireless device, it is understood that disclosed methodology may also be applied in many other available and future devices and systems such as cell phones and personal wireless and other hand-held or laptop devices capable of taking pictures and/or video recordings. Such devices may also include any of many available input devices, including, inter alia, touch-sensitive screens or touch-sensitive input pads, to achieve the beneficial functional features described herein.

In accordance with the present disclosure, if the media on which a video recording or still picture will be recorded, has a set amount of space available and it is known how much video or how many still pictures will be taken, this can be set on the camera and taken as input to determine the quality or resolution of the content in order to be able to fit a designated number of pictures or video in the memory space available. For either video or still cameras, the resolution of the image or the compression at which the image/frame is recorded can be adjusted to meet the needs of the user and amount of memory space available. For example, if fifty still pictures need to be taken and there is 73 MB of free space on the camera's memory card, by entering the number of pictures to be taken, it can be determined that the resolution of the pictures needs to be 1680×1060 and the compression needs to be set to 20%. When it is determined that a certain amount of still pictures or digital video is needed, this desired time frame (or number of still pictures) will be entered into the device. All the different aspect ratios and qualities need to be closely evaluated to determine exactly how much storage is required for each combination to determine if it is possible for the data to be stored on the media. Once the check is complete for adequate space, it can also be determined what aspect ratio and compression or quality is needed to fit the video data on the media. After the device determines what ratio/quality is needed, this is presented to the user and can accept or reject the recommended setting. In situations where there is more than one combination of video parameters that can be implemented to fit the number of pictures and/or video into the available memory space, then all combinations can be presented to the user for selection of the preferred combination or automatically implemented according to a predetermined priority assignment for the individual parameters.

In one example of an implementation of the disclosed system, if it is known that 30 minutes of video need to recorded, the user can enter this in a menu. If there is 200M free memory space for data storage, the camera will prompt the user stating that a ratio of 640×480 is needed and compression needs to be at: 15% in order to get 30 minutes of video recorded.

In another example, if a still picture is needed for 45 individuals this number can be entered into a menu. If there is 30M tree memory space for data storage, the camera or other picture taking device will display a prompt stating that pictures will be taken at 1680×1060 and compression will be at 10%.

In the drawings, FIG. 1 illustrates an exemplary environment in which the present invention may be implemented. As shown, a camera or other picture or video recording device includes a processor system 101 which is connected to a main bus 103. The main bus 103 is also coupled to, inter alia, system memory 105, a local storage system 107, which may comprise a Flash memory unit, and an input interface 111. The input interface 111 is arranged to receive user inputs from a keypad 113 or a pointer moving device 115. The main bus 103 is also connected to a display system 117. The input and/or display system may also comprise a touch-sensitive screen or optically-sensitive input pad (not shown). Additional devices and bus systems, which are not shown, may also be coupled to the system main bus 103. For example, a camera ON-OFF switch and a picture-taking mode switching device may also be coupled to the main bus 103.

Figure 2:
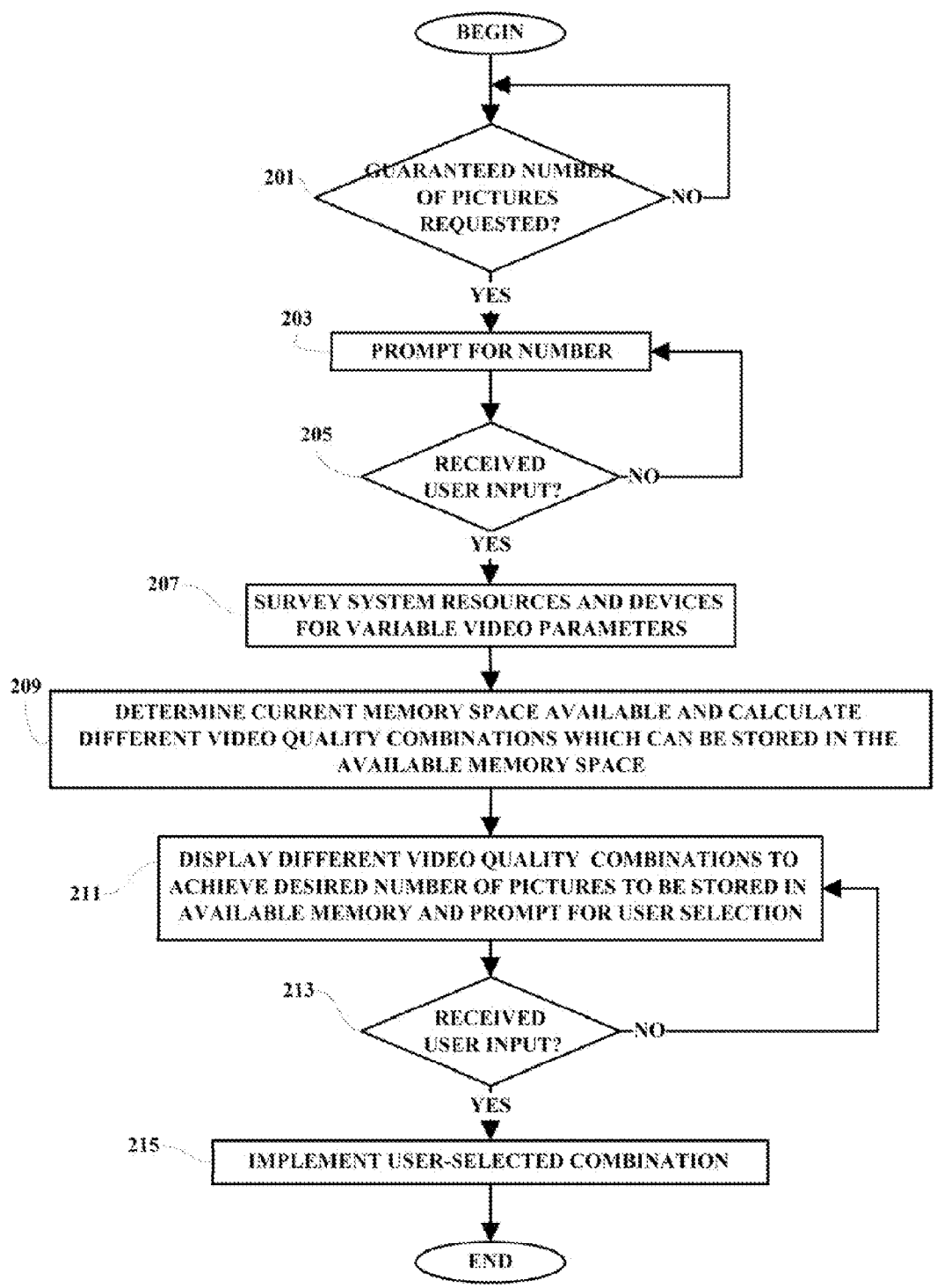
FIG. 2 is a flow chart illustrating an exemplary sequence of operations in one embodiment of the present invention.

In FIG. 2, there is shown a flow chart illustrating an exemplary sequence of operations in one embodiment of the present invention. As illustrated, when a user requests a specific number of pictures to be taken and stored, the system prompts the user 203 to input the user's desired number of pictures. The flowchart is explained in terms of a number of still pictures to be taken but it is understood that a specified time period for a running video recording, or a combination of still pictures and video can also be implemented. When an input is received, from the user 205, the system surveys the user's system resources and devices 207. This process determines which qualities and/or parameters of an image can be modified to provide a higher quality or larger image and what the trade-offs are in terms of memory used. For example, a first certain number of images or pictures may be stored for a given storage space at 1680×1060 resolution and a compression factor of 10%. However, a greater number of pictures may be stored within the same available storage space if the compression factor is 15%. Both of these options can be determined and presented for selection of the user's preferred resolution and compression factor.

Next, the current memory space available for storing video data is determined 209 and calculations are made to determine one or a schedule of different video quality parameters that can be used in combinations to achieve the storing of the user-input number of images to be taken in the currently available memory space. The system may also determine a next-higher or next-lower number of pictures that can be taken and saved in currently available memory space if taken at lower or higher resolutions, respectively.

Figure 3:
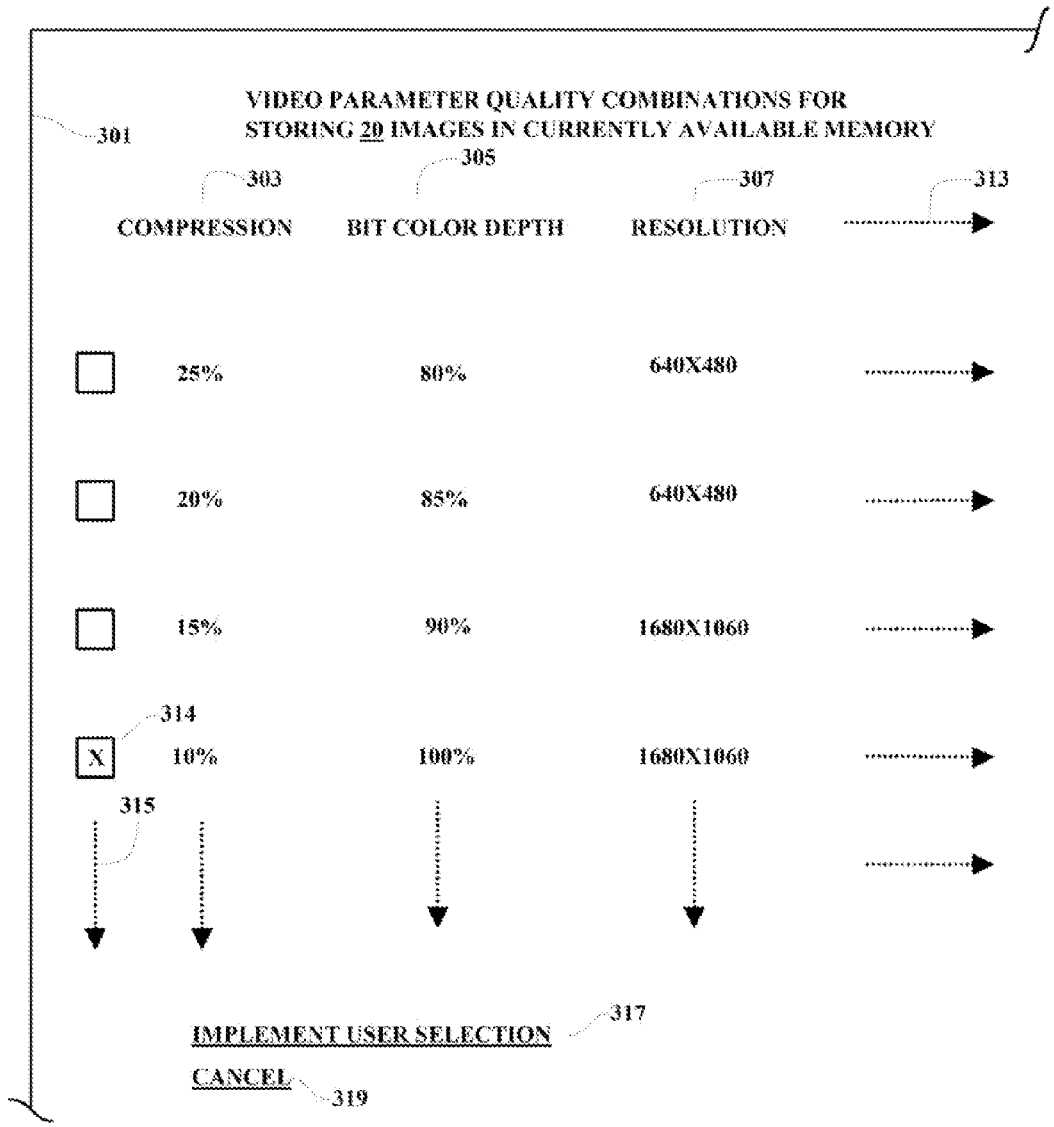
FIG. 3 is an illustration of an exemplary display presentation to enable user selection of a user-preferred implementation for saving video images.

For example, such a schedule is illustrated in FIG. 3. The schedule of possible video quality settings is presented 211 on a display device for the user to select which combination the user would prefer to implement based upon the number of pictures and quality of pictures needed by the user. If a quality level cannot be achieved for the input number of pictures to be taken by the user, the user may choose another combination in which the quality of the pictures is increased but the number of pictures that can be stored in available memory is decreased.

The user will then select and input the combination of video quality parameters (e.g. FIG. 3) most needed for the user's particular application 213 and the system will then implement 215 the combination selected by the user in order to guarantee the number of pictures needed by the user will be able to be stored in the currently available device memory space.

In some cases, the schedule may indicate that the user-requested number of images or pictures cannot be stored into the currently available memory space in which case the user will be enabled via menu input to indicate a lower number of pictures to be taken.

In any event, the present system enables the user to determine ahead of time whether there is enough currently available memory space to store a designated number of pictures or designated amount of running time for a streaming video. The system also enables a user to select which combination of video quality parameters is acceptable in order to best suit the particular application and environment of the user for the requested guaranteed number of pictures to be taken or amount of running time for a streaming video.

An exemplary Video Parameter Quality Combination Schedule for scoring a number of images or pictures in currently available memory is illustrated in FIG. 3. As shown, a user has designated that the user wishes to take 20 images or pictures and needs to know whether or not there is enough available memory in the user's picture taking device to store the 20 pictures to be taken. The schedule is displayed to the user on a display device screen 301 and includes the number of pictures which are to be taken together with various combinations of video parameters for the picture-taking device. Information related to variable video quality options is readily available from device manufacturers and may be assembled in database or other format for access by the system in creating the FIG. 3 schedule. The exemplary illustration shows variable video parameters including, inter alia, Compression 303, Bit Color Depth 305 and Resolution 307. Other parameters may also be displayed as indicated at 313. Various combinations of the parameters are shown in succeeding rows 315. Any combination of parameters presented may be selected and may be implemented to achieve the storing of the user-input "20" pictures at the parameter value as indicated in the selected row. As shown, the user has selected the fourth displayed row 314 which will accomplish the desired storing using a 10% compression factor, a 100% bit color depth and a resolution of 1680×1060 pixels. After selecting the preferred combination of parameter values, the user selects to implement the combination 317 and the selected values will be set for taking and storing 20 pictures in the device available memory space. The user may also choose to cancel the process 319 in which case the parameter values will not be changed from their current setting or default values.

In other possible scenarios, the schedule may indicate that there are no combinations of parameter values that will allow a storing of 20 pictures in device available memory space if it is determined that the currently available memory space is not large enough for 20 pictures no matter what parameter quality reductions are made. In any case, the user will know ahead of time if there is sufficient memory space to take and save a selected number of pictures at acceptable parameter settings.

In another embodiment, video/picture default quality values are set into the camera and the user will simply input the number of pictures or an amount of time for a video into a graphical user interface (GUI) and the system will display either a "Sufficient Memory" or "Insufficient Memory" indication to show that the current amount of available device memory is either sufficient or insufficient to store the number of pictures to be taken or amount of video time input by the user.

In another embodiment, a slider bar is presented to the user to allow higher resolution/lower quality or lower resolution/higher quality. This provides an interface for the user to easily distinguish the priorities the user may have for size vs. quality.

In still another embodiment, the user is enabled to set a minimum acceptable high resolution/quality standard, and then use this pre-set high quality standard until the available storage is full. When the storage is full, the user is enabled to use image processing capabilities on the camera to dynamically reduce the resolution/quality of the images taken, i.e. back-down or reduce the quality of the pictures already taken, just enough so that the new image/segment of video can be stored. In this manner, it is ensured that the quality/resolution is always at the highest possible setting for the number or pictures taken. When the minimum resolution/quality is reached, the dynamic managing of the quality of the images in stored media is terminated and the user is prompted for action.

Thus, there has been provided a method, programmed medium and system which enable user-controlled selection of video quality schemes in mobile picture-taking devices in order to provide a guaranteed number of pictures to be taken and/or amount of time for videos to be recorded.

The flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood that the specific example presented herein is not intended to be limiting since the functional combinations disclosed herein may be implemented in many different environments and applications including, for example, applications involving the visualization of business processes and movement of emails, task lists, task list items and other system data components within an overall system data containment environment or application.

The method, system and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a computer program product comprising a computer-readable, tangible storage device(s) and computer-readable program instructions stored on the computer-readable, tangible storage device(s) in any media, including any portable or fixed, volatile or non-volatile memory media device, including CDs, RAM and "Flash" memory, or other semiconductor, optical, magnetic or other memory media capable of storing code, from which it may be loaded and/or transmitted into other media and executed to achieve the beneficial results as described herein. The disclosed methodology may also be implemented using any available input and/or display systems including touch-sensitive screens and optically-sensitive input pads. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing video file storage in a memory of a camera device, said method comprising:
   providing user input means for receiving user input specifying a number of video files desired by a user to be stored in said memory;
   determining current device quality parameter settings for video files to be stored in said memory;
   determining an amount of memory space needed for each video file to be stored in said memory using said current device quality parameter settings with each video file having identical quality parameters corresponding to said current device quality parameter settings;
   determining an amount of currently available memory space in said memory for storing video files; and
   providing an output indication to said user, said output indication being representative of whether or not said amount of memory space currently available is sufficient to store said number of video files at said current device quality parameter settings.

2. The method as set forth in claim 1 wherein said video files are still image video files.

3. The method as set forth in claim 1 wherein said video files are moving image video files.

4. The method as set forth in claim 1 wherein said video files include both still image files and moving image files.

5. The method as set forth in claim 1 and further including:
   determining a schedule of combinations of video file quality parameter settings which, when set into said device, would allow storage of said number of video files in said currently available memory space;
   displaying said schedule to said user; and
   providing selection means to enable said user to select one of said device video file quality parameter setting combinations for implementation by said device.

6. The method as set forth in claim 5 and further including implementing said selected one of said device video file quality parameter setting combinations by said device in response to a selection of said one of said device video file quality parameter setting combinations by said user.

7. The method as set forth in claim 6 wherein at least one of said video file quality parameters is capable of being set to various levels whereby each level is determinative of a quality level at which said video files are stored, each of said levels requiring a different amount of storage space for each of said video files.

8. The method as set forth in claim 7 wherein one of said device video file quality parameters is a compression factor at which said video files may be stored.

9. The method as set forth in claim 7 wherein one of said device video file quality parameters is a resolution factor at which said video files may be stored.

10. A computer program product comprising a computer-readable, non-transitory tangible storage device(s) and computer-readable program instructions stored on the computer-readable, non-transitory tangible storage device(s) for processing video file storage in a memory of a camera device, the computer-readable program instructions, when executed by a processor system:
provide user input means for receiving user input specifying a number of video files desired by a user to be stored in said memory;
determine current device quality parameter settings for video files to be stored in said memory;
determine an amount of memory space needed for each video file to be stored in said memory using said current device quality parameter settings with each video file having identical quality parameters corresponding to said current device quality parameter settings;
determine an amount of currently available memory space in said memory for storing video files; and
provide an output indication to said user, said output indication being representative of whether or not said amount of memory space currently available is sufficient to store said number of video files at said current device quality parameter settings.

11. The computer program product as set forth in claim 10 wherein said video files are still image video files.

12. The computer program product as set forth in claim 10 wherein said video files are moving image video files.

13. The computer program product as set forth in claim 10 wherein said video files include both still image files and moving image files.

14. The computer program product as set forth in claim 10 wherein the computer-readable program instructions, when executed by a processor system:
determine a schedule of combinations of video file quality parameter settings which, when set into said device, would allow storage of said number of video files in said currently available memory space;
display said schedule to said user; and
provide selection means to enable said user to select one of said device video file quality parameter setting combinations for implementation by said device.

15. The computer program product as set forth in claim 14 wherein the computer-readable program instructions, when executed by a processor system:
implement said selected one of said device video file quality parameter setting combinations by said device in response to a selection of said one of said device video file quality parameter setting combinations by said user.

16. The computer program product as set forth in claim 15 wherein at least one of said video file quality parameters is capable of being set to various levels whereby each level is determinative of a quality level at which said video files are stored, each of said levels requiring a different amount of storage space for each of said video files.

17. The computer program product as set forth in claim 16 wherein one of said device video file quality parameters is a compression factor at which said video files may be stored.

18. The computer program product as set forth in claim 16 wherein one of said device video file quality parameters is a resolution factor at which said video files may be stored.

19. A device operable for taking still and moving video files and saving said video files in a device memory, said device comprising:
a device memory;
user input means for receiving user input specifying a number of video files desired by a user to be stored in said memory;
means for determining current device quality parameter settings for video files to be stored in said memory;
means for determining an amount of memory space needed for each video file to be stored in said memory using said current device quality parameter settings with each video file having identical quality parameters corresponding to said current device quality parameter settings;
means for determining an amount of currently available memory space in said memory for storing video files; and
means for providing an output indication to said user, said output indication being representative of whether or not said amount of memory space currently available is sufficient to store said number of video files at said current device quality parameter settings.

20. The device as set forth in claim 19, and further including:
means for determining a schedule of combinations of video file quality parameter settings which, when set into said device, would allow storage of said number of video files in said currently available memory space; and
display means for displaying said schedule to said user, said user input means being arranged enable said user to select one of said device video file quality parameter setting combinations for implementation by said device.

* * * * *